(12) United States Patent
Groble

(10) Patent No.: US 7,818,271 B2
(45) Date of Patent: Oct. 19, 2010

(54) PARAMETERIZED STATISTICAL INTERACTION POLICIES

(75) Inventor: Michael E. Groble, Lake Zurich, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 750 days.

(21) Appl. No.: 11/762,385

(22) Filed: Jun. 13, 2007

(65) Prior Publication Data
US 2008/0313116 A1 Dec. 18, 2008

(51) Int. Cl.
*G06F 15/18* (2006.01)
(52) U.S. Cl. .............................. 706/12; 706/45; 706/47; 706/52; 706/62; 704/200; 704/231; 704/232; 704/246; 704/255; 704/256
(58) Field of Classification Search ........................ None
See application file for complete search history.

(56) References Cited

U.S. PATENT DOCUMENTS

| | | | |
|---|---|---|---|
| 6,052,723 A | | 4/2000 | Ginn |
| 6,088,801 A | | 7/2000 | Grecsek |
| 6,259,969 B1 | * | 7/2001 | Tackett et al. ............... 700/264 |
| 6,421,655 B1 | | 7/2002 | Horvitz et al. |
| 6,622,119 B1 | | 9/2003 | Ramaswamy et al. |
| 6,751,606 B1 | * | 6/2004 | Fries et al. .......................... 1/1 |
| 6,785,651 B1 | | 8/2004 | Wang |
| 6,785,728 B1 | | 8/2004 | Schneider et al. |
| 6,931,384 B1 | | 8/2005 | Horvitz et al. |
| 2003/0220901 A1 | * | 11/2003 | Carr et al. ....................... 707/1 |
| 2004/0030556 A1 | * | 2/2004 | Bennett ....................... 704/270 |
| 2004/0177051 A1 | * | 9/2004 | Bridges et al. ................. 706/11 |
| 2005/0015519 A1 | * | 1/2005 | Hodjat et al. .................. 710/15 |
| 2005/0086049 A1 | * | 4/2005 | Bennett .......................... 704/4 |
| 2005/0125390 A1 | * | 6/2005 | Hurst-Hiller et al. ............ 707/3 |
| 2006/0206337 A1 | * | 9/2006 | Paek et al. .................. 704/275 |
| 2006/0277591 A1 | | 12/2006 | Arnold et al. |

OTHER PUBLICATIONS

Yoshiko Kuwahara, "Corresponding Application PCT/US2008/065854—PCT International Preliminary Report on Patentability," The International Bureau of WIPO, Geneva, Switzerland, Dec. 30, 2009, 6 pages, most relevant pp. 2 and 5-6.

* cited by examiner

*Primary Examiner*—Donald Sparks
*Assistant Examiner*—Omar F Fernandez Rivas

(57) ABSTRACT

A method and apparatus are disclosed for selecting interaction policies. Values may be provided for a group of parameters for user models. Interaction policies within a specific tolerance of an optimal interaction policy for the user models may be learned. Up to a predetermined number of the learned interaction policies, within a specific tolerance of an optimal policy for the user models, may be selected for a wireless communication device. The wireless communication device, including the selected interaction policies, may determine whether any of a group of parameters, representing a user preference or contextual information with respect to use of the wireless communication device, is updated. When any of the group of parameters has been updated, the wireless communication device may select one of the selected interaction policies, such that the selected one of the selected interaction policies may determine a better interaction behavior for the wireless communication device.

4 Claims, 11 Drawing Sheets

PARAMETERIZED STATISTICAL INTERACTION POLICIES

BACKGROUND OF THE INVENTION

1. Field of the Invention

The invention relates to processing devices, and in particular, processing devices having policies that govern interactions with users.

2. Introduction

Interaction policies may be implemented for processing devices, such that interactive behavior of the processing devices may be governed by the implemented interaction policies. Ideally, each of the processing devices would include an implemented interaction policy for each individual user. However, implementation of such interaction policies would be cost prohibitive.

Two widely used methods for implementing interaction policies are Bayesian networks (either static or dynamic) or Markov decision processes (either fully observable or partially observable). Bayesian networks provide for customization of an interaction policy by permitting variables, which represent user preferences, to be defined. The Bayesian networks determine an action to perform based on inference, or drawing a conclusion from what is already known. Inference is computationally costly and is performed at each dialog step. Reinforcement learning is an approach for learning customized interaction policies or Markov decision processes. Reinforcement learning algorithms attempt to learn a policy which maximizes a reward over the course of a problem. One problem with reinforcement learning for managing interactions is that reward measures are subjective and are rarely explicitly provided by a user. That is, the user will rarely rate an interaction after it is completed or provide feedback to a device with respect to how well the device handled the initial goal of the user. Another problem is the computational expense with respect to computing optimal, or even sub-optimal interaction policies.

SUMMARY OF THE INVENTION

A method and apparatus that selects up to a predetermined number of interaction policies for a wireless communication device is provided. Values for groups of parameters for user models may be provided. Each of the parameters may represent a user preference or contextual information with respect to use of the wireless communication device. Interaction policies that are within a specific tolerance of an optimal interaction policy, with respect to the user models, may be learned. Up to the predetermined number of the learned interaction policies may be selected for use with the wireless communication device.

The wireless communication device, which includes a number of learned interaction policies, may determine whether any parameters representing a user preference or contextual information with respect to use of the wireless communication device are updated. Each of the learned interaction policies may be associated with a respective interaction behavior for the wireless communication device. If any of the parameters are determined to be updated, the wireless communication device may select and activate one of the predetermined number of learned interaction policies, such that the selected and activated one of the predetermined number of learned interaction policies may determine a better dialog behavior for the wireless communication device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

A first aspect of the invention concerns a method and an apparatus for selecting up to a predetermined number of interaction policies suitable for use on a processing device. User models may represent expected users of the processing device. Each of the user models may include a parameterized interaction model and a parameter set having a particular set of values. A combination of the parameterized interaction model and the parameter set may define a specific interaction model (or user model) with a specific set of transitions, observations, and reward functions. In various embodiments, a number of interaction policies may be learned, which are suitable for users corresponding to the user models. Up to a predetermined number of learned interaction policies may be selected, such that the selected interaction policies maximize an expected reward over a population of the expected users and the selected interaction policies have a minimum size. The expected reward may be determined based on a particular set of values for a parameter set.

A second aspect of the invention concerns a second processing device, such as, for example, a wireless communication device, or other device. The second processing device may include a predetermined number of interaction policies previously selected by an embodiment of the first aspect of the invention. In embodiments of the second aspect of the invention, when a change is detected in the parameters defining user preferences and/or contextual information with respect to use of the second processing device, an interaction policy from among the predetermined number of interaction policies may be selected and activated to govern the interactive behavior of the second processing device. The selected and activated interaction policy may be more suitable for a user, according to the changed parameters, than a previously used interaction policy.

Figure 1:
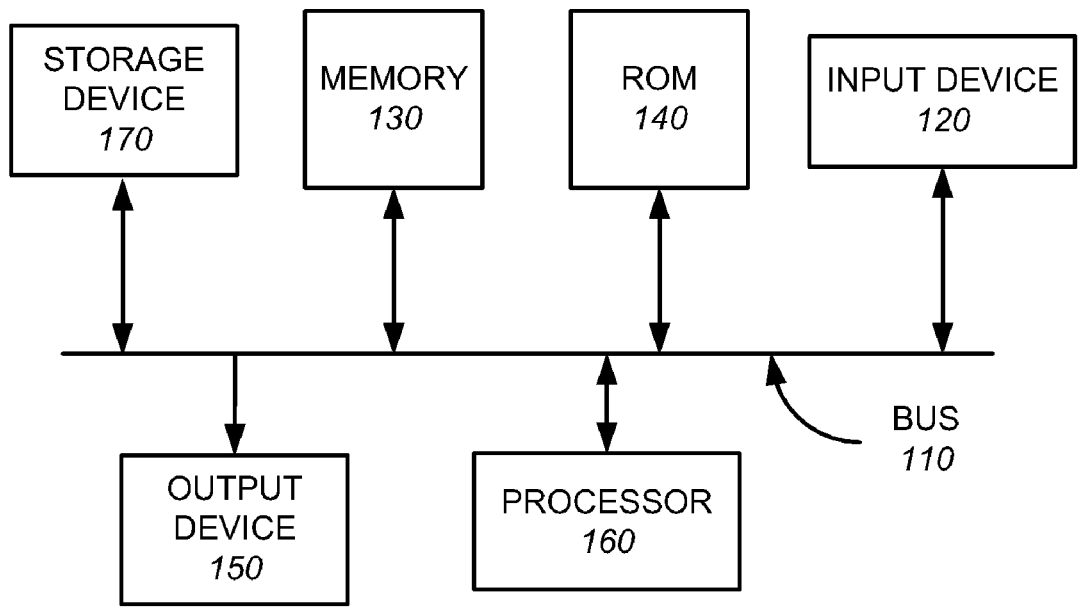
FIG. 1 illustrates an exemplary block diagram of a first processing device in an embodiment consistent with the subject matter of this disclosure.

FIG. 1 is a block diagram that illustrates an exemplary processing device 100, which may be used to implement embodiments consistent with the first aspect of the invention. Processing device 100 may include a bus 110, an input device 120, a memory 130, a read only memory (ROM 140, an output device 150, a processor 160, and a storage device 170. Bus 110 may permit communication among components of processing device 100. Processing device 100 may be a desktop personal computer PC), a notebook PC, or other type of processing device.

Processor 160 may include at least one conventional processor or microprocessor that interprets and executes instructions. Memory 130 may be a random access memory (RAM), or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include any type of media for storing data and/or instructions.

Input device 120 may include one or more conventional mechanisms that permit a user to input information to processing device 100, such as, for example, a keyboard, a mouse, a touch screen, or other input device. Output device 170 may include one or more conventional mechanisms that output information to the user, including one or more displays, or other output devices.

Processing device 100 may perform such functions in response to processing device 120 executing sequences of instructions contained in a tangible machine-readable medium, such as, for example, memory 130, or other medium. Such instructions may be read into memory 130 from another machine-readable medium, such as storage device 150, or from a separate device via a communication interface (not shown).

Figure 2:
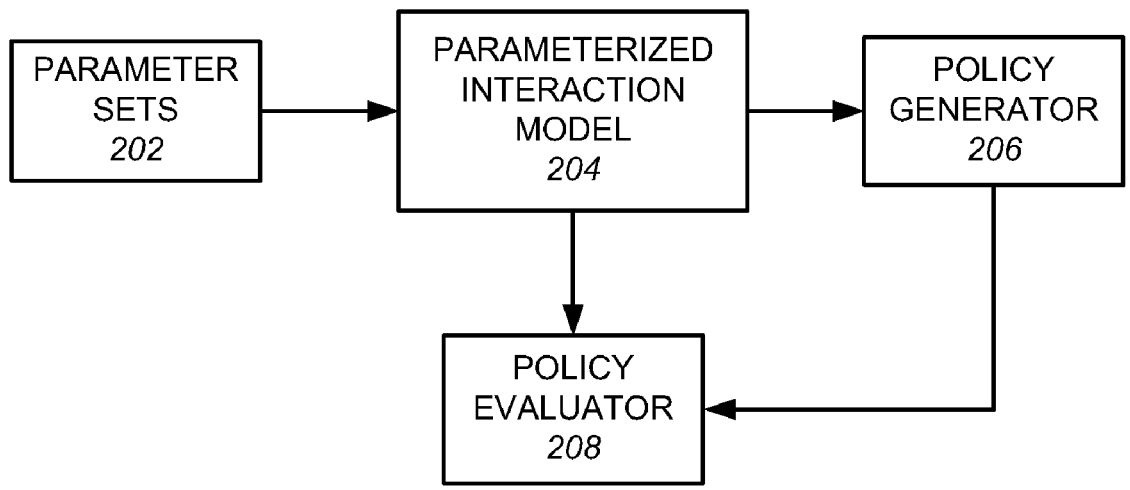
FIG. 2 illustrates an exemplary functional block diagram of the first processing device illustrated in FIG. 1.

FIG. 2 is a functional block diagram illustrating functions which may be performed by processing device 100. In one embodiment, the functions may be implemented by software modules. Processing device 100 may include parameter sets 202, parameterized interaction model 204, a policy generator 206, and a policy evaluator 208.

Parameter sets 202 may include groups of parameters with respective sets of values which may describe deterministic values and random variables, such as, for example, a success probability of a binomial distribution, a mean and a variance of a normal distribution, or other values or variables. Parameter values may specify transition probabilities, observation probabilities, and expected rewards. In some embodiments, parameter values for parameter sets 202 may be based on market surveys or market studies with respect to expected users of a processing device, such as, for example, a wireless communication device, or other processing device.

In one embodiment, parameter sets 202 may include user-oriented parameters and environment-oriented parameters. The user-oriented parameters may include probabilistic measures and utility measures. As an example, user-oriented parameters having probabilistic measures may include: input modality preference (e.g., speech vs. graphical user interface (gui)); output modality preference; or goal preference. User-oriented parameters having utility measures may include: a utility with respect to satisfying various goals; impatience (a utility of each dialog turn that does not satisfy a user goal); or tolerance (a utility of a dialog turn in which user input is misinterpreted). As an example, environment-oriented parameters may include: availability of input modalities; availability of output modalities; or accuracy of input modalities. The above-mentioned parameters are exemplary parameters, which may be included in various embodiments consistent with the subject matter of this disclosure. Other embodiments consistent with the subject matter of this disclosure may include additional, different, or other parameters.

Parameterized interaction model 204 may describe a family of interaction models. A combination of parameterized interaction model 204 and a specific one of parameter sets 202 may define a specific interaction model, or user model, with a specific set of transitions, observations, and reward functions.

Policy generator 206 may compute an optimal interaction policy based on a specific interaction model, or user model.

Policy evaluator 208 may evaluate or score an expected utility of an interaction policy over a set of specific interaction models, or user models.

Figure 3:
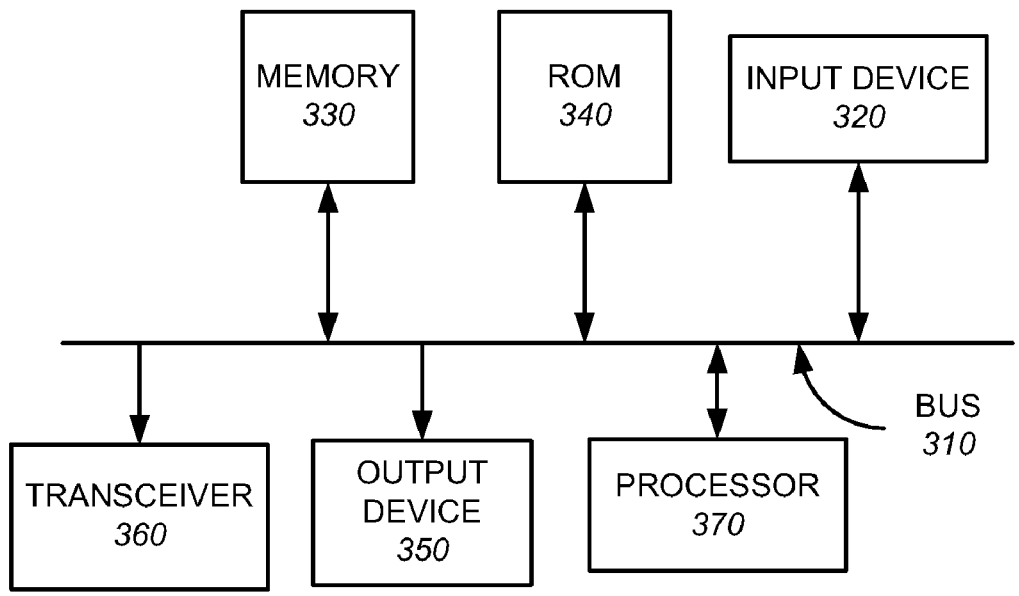
FIG. 3 illustrates an exemplary block diagram of a second processing device in an embodiment consistent with the subject matter of this disclosure.

FIG. 3 is a block diagram that illustrates an exemplary processing device 300, which may be used to implement embodiments consistent with the second aspect of the invention. Processing device 300 may be included in a wireless communication device, or other type of device. Processing device 300 may include a bus 310, an input device 320, a memory 330, a read only memory (ROM 340, an output device 350, a transceiver 360, and a processor 370. Bus 310 may permit communication among components of processing device 300.

Processor 370 may include at least one conventional processor or microprocessor that interprets and executes instructions. Memory 330 may be a random access memory (RAM), or another type of dynamic storage device that stores information and instructions for execution by processor 370. Memory 330 may also store temporary variables or other intermediate information used during execution of instructions by processor 370. ROM 340 may include a conventional ROM device or another type of static storage device that stores static information and instructions for processor 370.

Input device 320 may include one or more conventional mechanisms that permit a user to input information to processing device 300, such as, for example, a keyboard, a keypad, a touch screen, a microphone, or other input device. Output device 370 may include one or more conventional mechanisms that output information to the user, including one or more displays, a speaker, or other output devices.

Transceiver 360 may receive and transmit communications via a wireless network. The wireless network may be connected with one or more other wireless networks or other networks.

Figure 4:
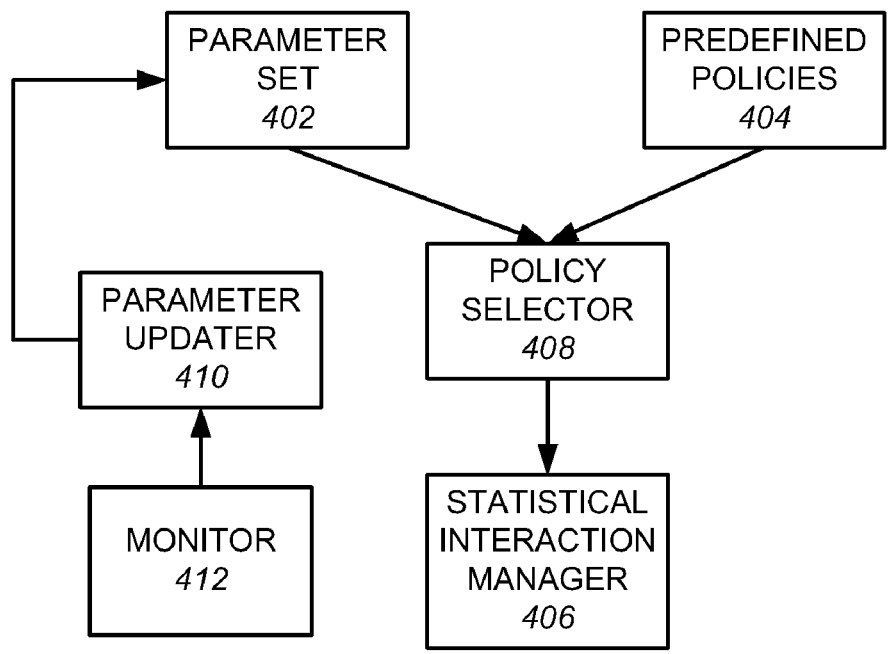
FIG. 4 shows an exemplary functional block diagram of the second processing device illustrated in FIG. 2.

FIG. 4 is a functional block diagram illustrating functions which may be performed by processing device 300. In one embodiment, the functions may be implemented by software modules. Processing device 300 may include a parameter set 402, predefined interaction policies 404, a policy selector 408, statistical interaction manager 406, a parameter updater 410, and a monitor 412.

Parameter set 402 may include a group of parameters with a respective set of values which may describe deterministic values and random variables, such as, for example, a success probability of a binomial distribution, a mean and a variance of a normal distribution, or other values or variables. Parameter set 402 may specify transition probabilities, observation probabilities, and expected rewards. Parameter set 402 may have values corresponding to a particular user of processing device 300. For example, parameter set 402 may correspond to preferences of the particular user (for example, a patient user, a tolerant user, etc.) and/or a context in which processing device 300 is operating (for example, a noisy environment, etc.).

As similarly discussed, with respect to parameter sets 202, parameter set 402 may include user-oriented parameters and environment-oriented parameters. The user-oriented parameters may include probabilistic measures and utility measures. As an example, user-oriented parameters having probabilistic measures may include: input modality preference (e.g., speech vs. graphical user interface gui)); output modality preference; or goal preference. User-oriented parameters having utility measures may include: a utility with respect to satisfying various goals; impatience (a utility of each dialog turn that does not satisfy a user goal); or tolerance (a utility of a dialog turn in which user input is misinterpreted). As an example, environment-oriented parameters may include: availability of input modalities; availability of output modalities; or accuracy of input modalities. The above-mentioned parameters are exemplary parameters, which may be included in various embodiments consistent with the subject matter of this disclosure. Other embodiments consistent with the subject matter of this disclosure may include additional, different, or other parameters.

Predefined policies 404 may correspond to a set of predefined interaction policies residing on processing device 300. In some embodiments, predefined policies 404 may have been evaluated by policy evaluator 208 of processing device 100 and selected to be included in processing device 300.

Policy selector 408 may classify parameter set 402 with respect to predefined policies 404. An interaction policy from predefined policies 404 and associated with a parameter set most similar to parameter set 402 may be selected by policy selector 408 and activated as a current interaction policy of processing device 300.

Statistical interaction manager 408 may maintain an internal state of processing device 300. For example, when processing device 300 implements a partially observable interaction model, the internal state may correspond to a belief state. Statistical interaction manager 408 may choose one or more actions based on a current internal state, an interaction model, and an interaction policy, such as, for example, an interaction policy selected by policy selector 408.

Monitor 412 may monitor a context in which processing device 300 may operate. For example, in one embodiment, monitor 412 may monitor conditions related to one or more environmental conditions, such as, ambient noise levels in an environment in which processing device 300 is operating and/or a recognition accuracy of processing device 300 with respect to recognizing input from a user, such as, for example, an utterance. When a change beyond a predetermined threshold in the one or more environmental conditions is detected by monitor 412, monitor 412 may provide an indication of the changed environmental condition to parameter updater 410.

Parameter updater 410 may receive an indication of a change with respect to one or more user preferences or a context in which processing device 300 may operate. As a result of receiving the indication, parameter updater 410 may update one or more parameters of parameter set 402, accordingly. For example, when parameter updater 410 receives information with respect to a current noise level or recognition accuracy, parameter updater 410 may update a value of a parameter of parameter set 402 corresponding to the current noise level or the recognition accuracy. In some embodiments, the user may provide information, such as, user preference information, or other information, by configuring processing device 300, or in response to a query from processing device 300. In response to receiving the user preference information, or other information, parameter updater 410 may update one or more values of parameters of parameter set 402.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 5:
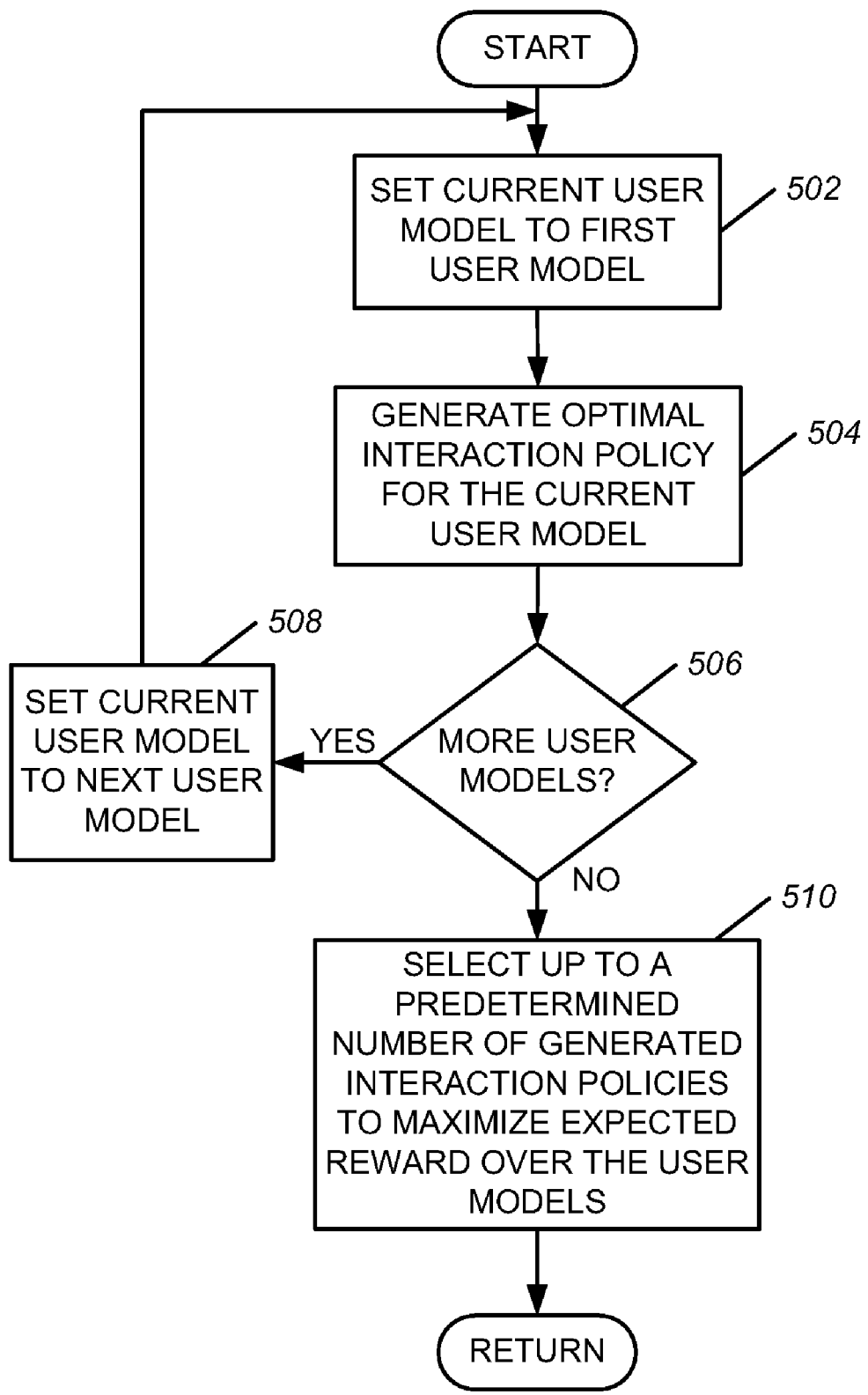
FIG. 5 is an exemplary a flowchart illustrating a process which may be implemented in an embodiment of the first processing device.

FIG. 5 is an exemplary flowchart illustrating steps which may be performed by processing device 100 in an embodiment consistent with the subject matter of this disclosure. At step 502, processing device 100 may set a current user model to a first user model. Processing device 100 may perform step 502 by setting information, concerning the current user model, to refer to parameterized interaction model 204 and a particular parameter set of parameter sets 202.

At step 504, policy generator 206 may generate an optimal interaction policy with respect to the current user model.

At step 506, processing device 100 may determine whether there are more user models. In one embodiment, processing device 100 may determine whether there are more user models by determining whether any additional parameter sets of parameter sets 202 exist.

If there are more user models, then, at step 508, processing device 100 may set a current user model to refer to a next user model (for example, a next parameter set of parameter set 202 and parameterized interaction model 204). Processing device 100 may then repeat steps 502-506.

If, at step 506, processing device 100 determines that there are no additional user models, then, at step 510, policy evaluator 208 may score each of the generated interaction policies with respect to the user models and may select up to a predetermined number of the generated interaction policies to maximize expected reward over the user models and minimize policy size.

In one embodiment, policy evaluator 208 may calculate an average score of each of the generated interaction policies with respect to each of the user models. The average score of each of the generated interaction policies may be calculated based on simulating, at least a specific number of times, user actions with respect to each of the user models and each of the interaction policies. Policy evaluator 208 may then determine which ones of the generated interaction policies have a respective average score within a specific tolerance of an optimal interaction policy score for each of the user models. Policy evaluator 208 may then select up to the predetermined number of interaction policies with highest scores within the specific tolerances of the optimal interaction policy scores for each of the user models. In some embodiments, processing device 100 may select up to the predetermined number of interaction policies with highest scores within the specific tolerances of the optimal interaction policy scores for each of the user models that achieve a goal of the user within a minimum number of dialog turns, based on the simulating, where a dialog turn may be defined as one user action or one agent action, such as, for example, an action of statistical interaction manager 406.

Further, in various embodiments, policy evaluator 208 may classify each of parameter sets 202 as being associated with a respective one of up to the predetermined number of interaction policies.

Figure 6:
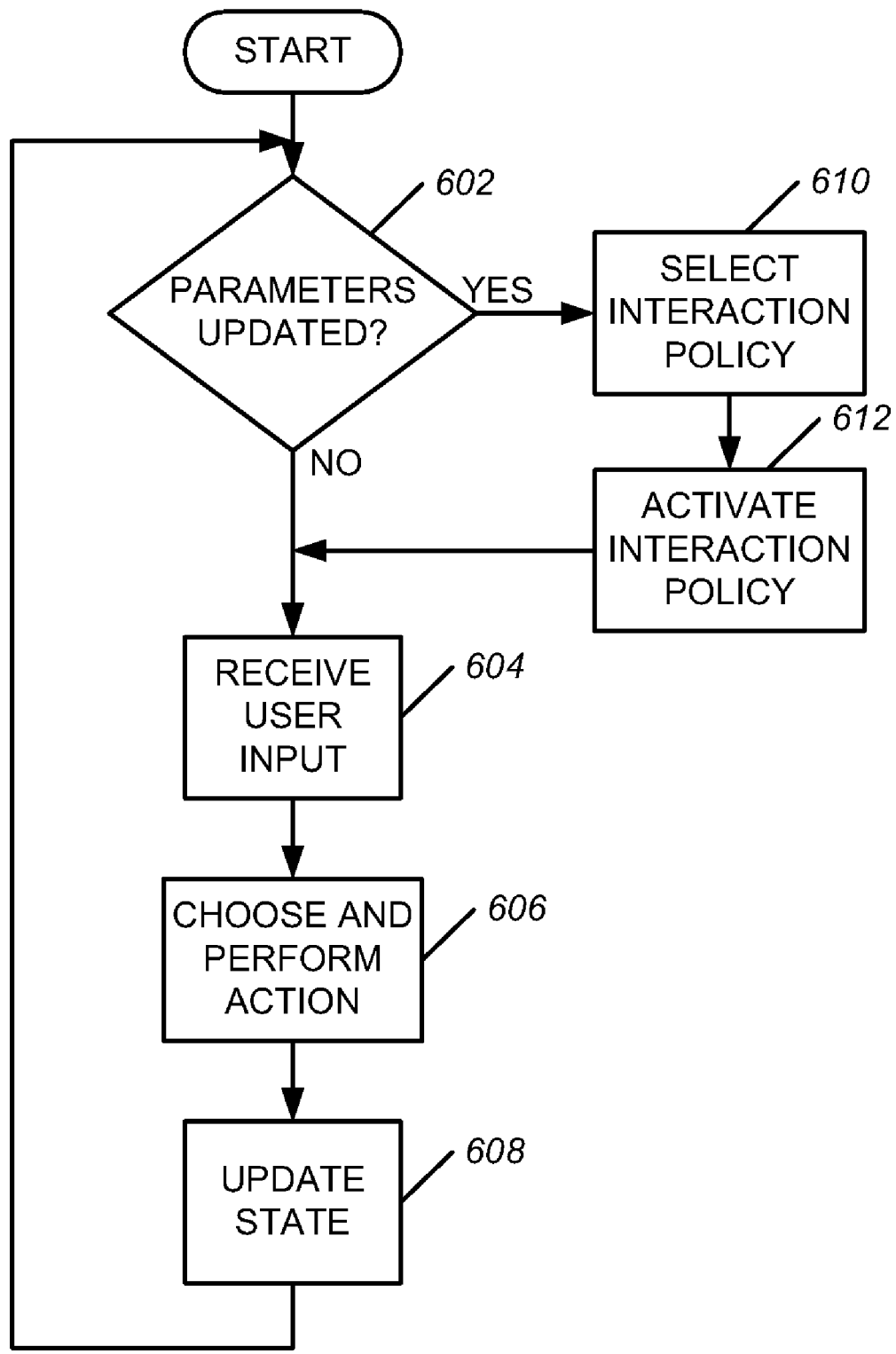
FIGS. 6-8 are flowcharts illustrating exemplary processes which may be implemented in embodiments of the second processing device.

FIG. 6 is an exemplary flowchart illustrating steps which may be performed by processing device 300 in an embodiment consistent with the subject matter of this disclosure. At step 602, parameter updater 410 may determine whether any parameters, associated with a user of processing device 300, or a context in which processing device 300 is used has changed. If parameter updater 410 determines that none of the parameters has changed, then, at step 604, processing device 300 may receive a user input. The user input may correspond to an indication from the user of a desire to achieve a particular goal, such as, for example, making a phone call to a particular party, sending an e-mail message, or other goal.

At step 606, statistical interaction manager 406 may examine the indication from the user in view of a current internal state of processing device 300, parameter set 402, and a current interaction policy and may choose and perform an action.

At step 608, statistical interaction manager 406 may update the current internal state of processing device 300 and may repeat steps 602-608.

If, at step 602, parameter updater 410 determines that one or more parameters associated with the user of processing device 300 or a context in which processing device 300 is used has changed, then parameter updater 410 updated one or more of the parameters, and policy selector 408 may select a best interaction policy from among predefined policies 404 based on a parameter set associated with the current user of processing device 300 and/or a current operating environment of processing device 300, and respective parameter sets associated with predefined policies 404 (step 610). In an embodiment in which policy evaluator 208 of processing device 100 classifies each of parameter sets 202 as being associated with a respective one of up to the selected predetermined number of interaction policies, predefined policies 404 may include up to the selected predetermined number of interaction policies and associated parameter sets of parameter sets 202 with respect to each interaction policy of predefined policies 404. Policy selector 408 may include a classifier to classify the parameter set (parameter set 402, in some embodiments) associated with the current user of processing device 300 and/or a current operating environment of processing device 300 as being associated with an interaction policy of predefined policies 404. The classifier may select an interaction policy from among predefined policies 404 having an associated parameter set that best matches the parameter set associated with the current user of processing device 300 and/or a current operating environment of processing device 300 (parameter set 402).

At step 612, policy selector may activate the selected interaction policy, such that the selected interaction policy may be used by statistical interaction manager 406 to determine an action to perform based on an internal state of processing device 300 and an input provided by the user.

Figure 7:
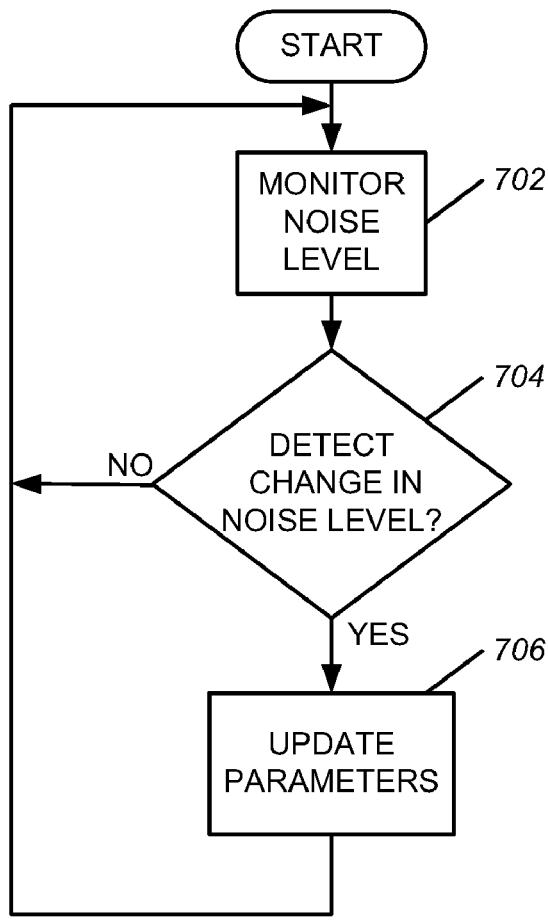

FIG. 7 is an exemplary flowchart illustrating steps which may be performed by processing device 300 in an embodiment in which an environmental condition, such as, for example, noise levels may be monitored. At step 702, monitor 412 of processing device 300 may sample noise levels. The noise levels may be sampled at a time when a user is not providing input to processing device 300. At step 704, monitor 412 may determine whether the detected noise level is different from a previously detected noise level, which may have caused parameter updater 410 to previously update at least one parameter associated with the current operating environment of processing device 300. In some embodiments, monitor 412 may not consider the detected noise level to be different from the previously detected noise level unless a measured difference of the detected noise level is greater than a threshold value. If monitor 412 determines that the measured difference of the detected noise level, with respect to the previously detected noise level, is greater than the threshold value, then parameter updater 410 may update at least one of parameter associated with the current operating environment of processing device 300.

In an alternate embodiment, monitor 412 may monitor recognition accuracy of user input instead of, or in addition to, monitoring noise levels. Monitor 412 may infer a change in recognition accuracy based on user actions in response to actions performed by statistical interaction manager 406.

The process illustrated by the flowchart of FIG. 7 is exemplary. In other embodiments, monitor 412 may monitor other conditions or behavior of processing device 300.

Figure 8:
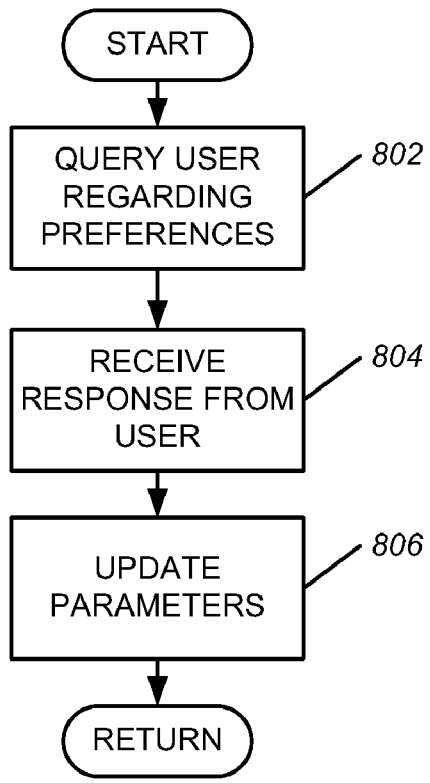
Figure 9:
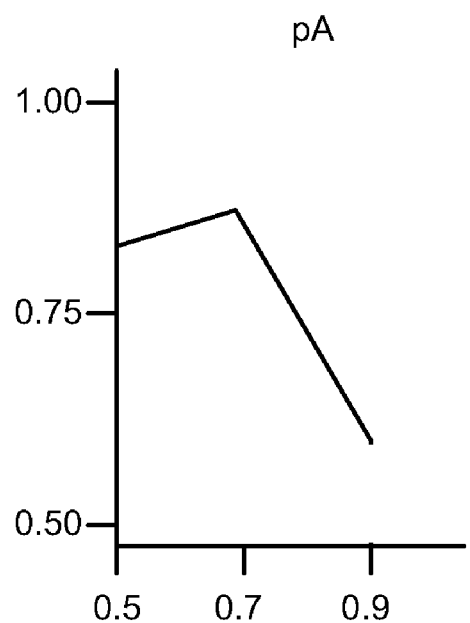
FIGS. 9-32 are graphs illustrating how values of parameters for user models may affect learned interaction behavior.
Figure 10:
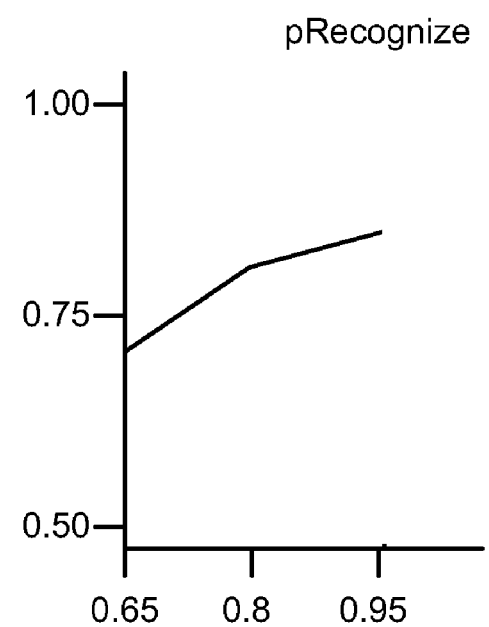
Figure 11:
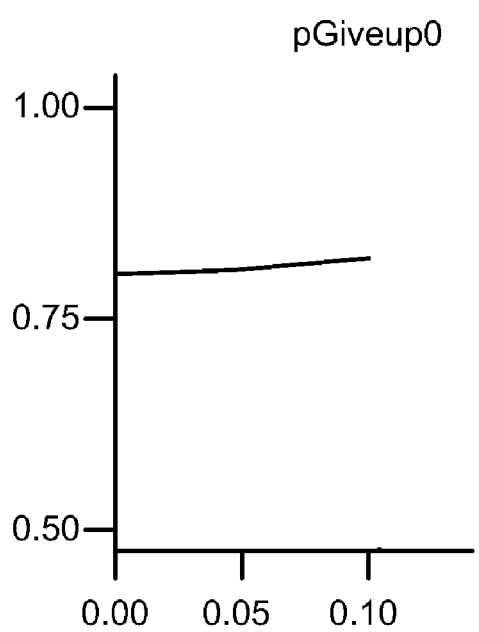
Figure 12:
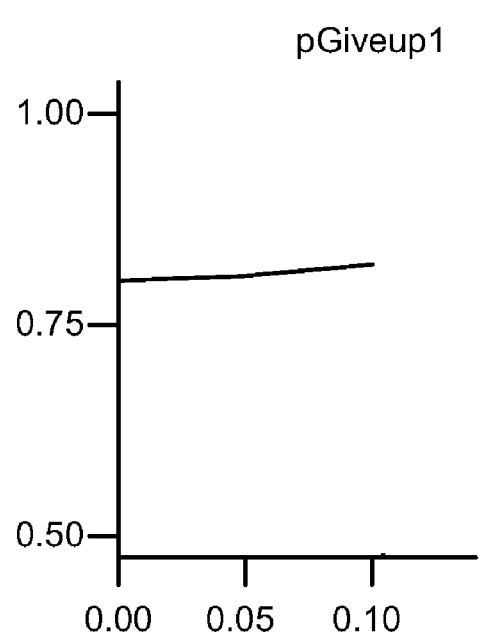
Figure 13:
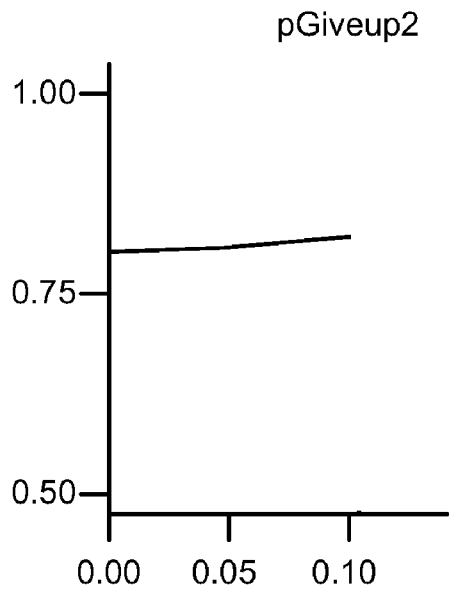

FIG. 8 is an exemplary flowchart illustrating steps which may be performed by processing device 300 in an embodiment in which a user may be queried with respect to user preferences. The process may begin at step 802 with processing device 300 presenting a query to the user regarding user preferences. The query may be presented to the user via a display of processing device 300, may be announced to the user via a speaker of processing device 300, or may be presented via a different means. As an example of a query, processing device 300 may ask the user whether processing device 300 takes too long to determine a goal of the user. Of course, processing device 300 may ask a user for other information regarding preferences of the user or information with respect to an environment in which processing device 300 may operate.

At step 804, processing device 300 may receive a response to the query and, at step 806, parameter updater 410 may update one or more parameters associated with the user of processing device 300, or a context in which processing device 300 is used, if a value of any of the parameters has changed.

The following describes an experiment, which demonstrates parameterized statistical models in a simple, but realistic scenario. The scenario is a dialog scenario in which one of two different actions may be selected by a user. A state space for the dialog scenario may be represented in a factored form having separate states for a user goal, a user action, and a dialog history. For this experiment, the states were as follows:

User Goals={a, b, done, exit, give-up}
User Actions={open, say-a, say-b, say-yes, say-no, say-exit, close}
Dialog History={no-0, no-1, no-2}

An initial user goal was one of "a" or "b". The "done" state corresponds to the initial user goal being satisfied. The "exit" state corresponds to the user being interrupted and exiting an application before completing the goal. The "give-up" state corresponds to the user becoming frustrated with misrecognitions of input from the user and exiting the application without achieving the initial user goal.

With respect to user actions, the "open" state corresponds to the user opening the application, the "say-a", "say-b", "say-yes", "say-no", and "say-exit" states correspond, respectively, to the user providing inputs corresponding to "a", "b", "yes", "no", and "exit", and the "close" state corresponds to the user closing the application.

With respect to the dialog history state, "no-0" corresponds to the user having 0 previous "say-no" actions, "no-1" corresponds to the user 1 previous "say-no" action, and "no-2" corresponds to the user having 2 previous "say-no" actions.

Actions, which may be performed by an agent, such as, for example, statistical interaction manager 406, may include requesting which item is desired, confirming a selection of "a", confirming a selection of "b", doing the selected item "a", doing the selected item "b" and exiting, as indicated below.

Agent Actions={request, conf-a, conf-b, do-a, do-b, do-exit}

In this experiment, the state was not directly observable to the agent and observations may represent how the agent recognizes the user actions. The observation states were as follows.

Observations={in-open, in-a, in-b, in-yes, in-no, in-exit}

In the experiment, a decision process was parameterized according to Table 1.

TABLE 1

| | |
|---|---|
| pA | Probability that the user will start with goal "a" (as opposed to goal "b") |
| pRecognize | Probability that input (i.e., an utterance) is correctly recognized |
| pGiveup0 | Probability that the user will get frustrated and give up after misrecognition of user input with 0 previous |

TABLE 1-continued

| | |
|---|---|
| | "say-no" actions by the user |
| pGiveup1 | Probability that the user will get frustrated and give up after misrecognition of user input with 1 previous "say-no" actions by the user |
| pGiveup2 | Probability that the user will get frustrated and give up after misrecognition of user input with 2 previous "say-no" actions by the user |
| patience | Reward for every act that does not complete a goal |
| tolerance | Reward for not achieving an initial goal of the user |
| forgiveness | Reward for putting the user in the "give-up" state |

During the experiment, the above parameters were varied over a range of values and a corresponding optimal interaction policy was developed by a policy generator, such as, for example, policy generator 208. In some cases, learned interaction policies did not include all possible actions that the agent could take.

Figure 14:
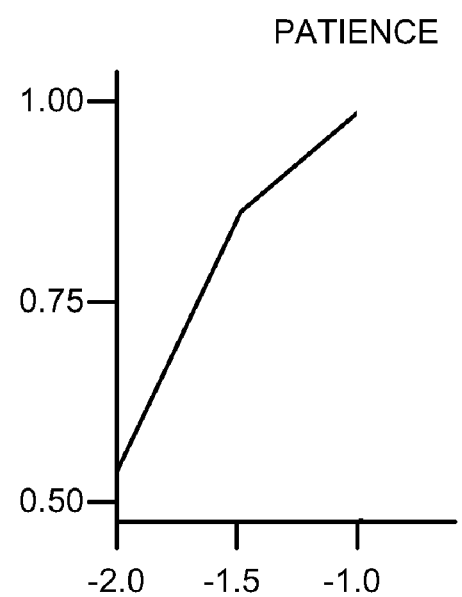
Figure 15:
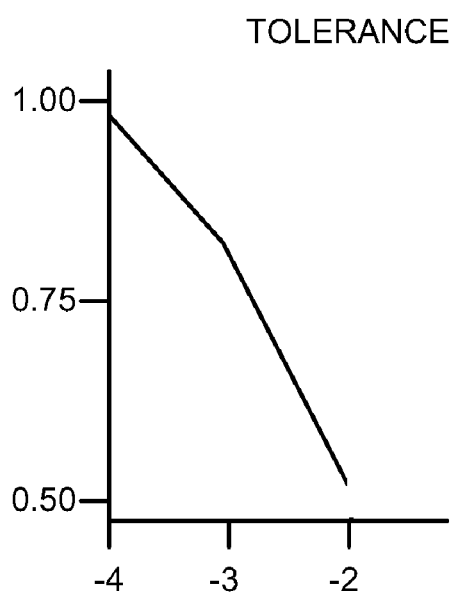
Figure 16:
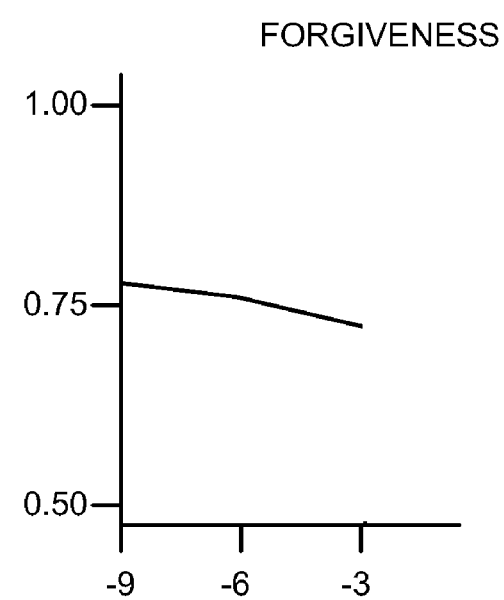

FIGS. 9-16 show how inclusion of the agent action, "request", varies for learned interaction policies depending on the values of the parameters. In FIGS. 9-16, a vertical axis of each graph represents a percentage of dialogs in which the agent performs a "request" action (for example, 1.00 indicates 100%). According to FIGS. 9-16, inclusion of the agent action, "request", depends most significantly on the parameters "pA", "patience", and "tolerance". For example, according to FIG. 9, as the probability, "pA", that the user will start with goal "a" increases, there is less of a need for the agent to perform a "request" action. The agent may be more effective by simply performing a "conf-a" or a "do-a" action. Similarly, if the user has a low patience level, as shown in FIG. 14, the agent has a tendency to complete the dialog quickly and therefore, may forgo an initial "request" action. If the user has a high tolerance level for wrong actions, as shown in FIG. 15, the agent is less likely to perform a "request" action as a first action.

Figure 17:
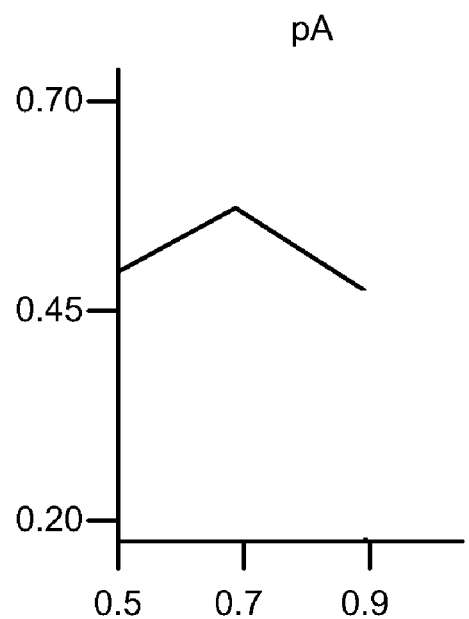
Figure 18:
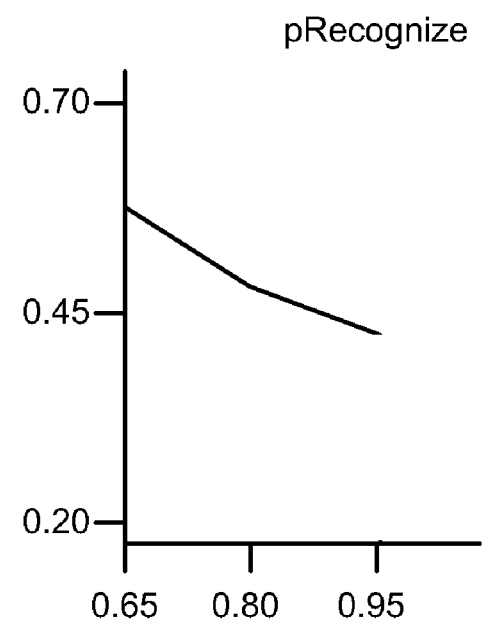
Figure 19:
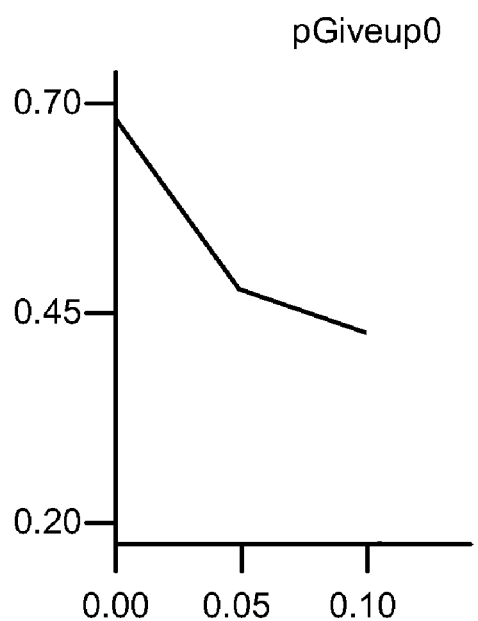
Figure 20:
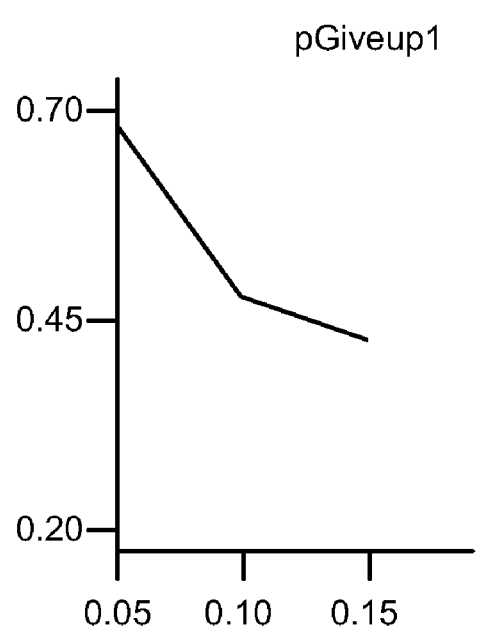
Figure 21:
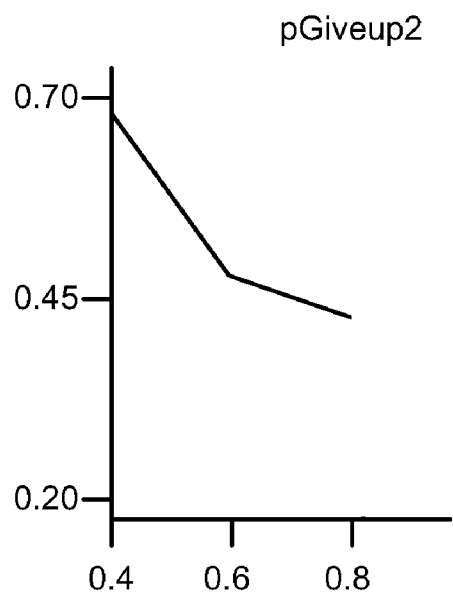
Figure 22:
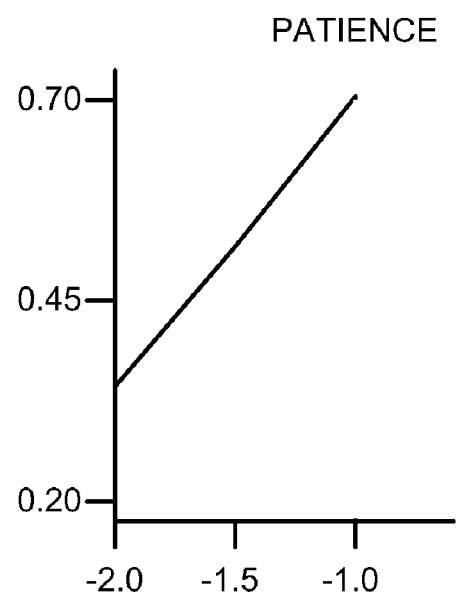
Figure 23:
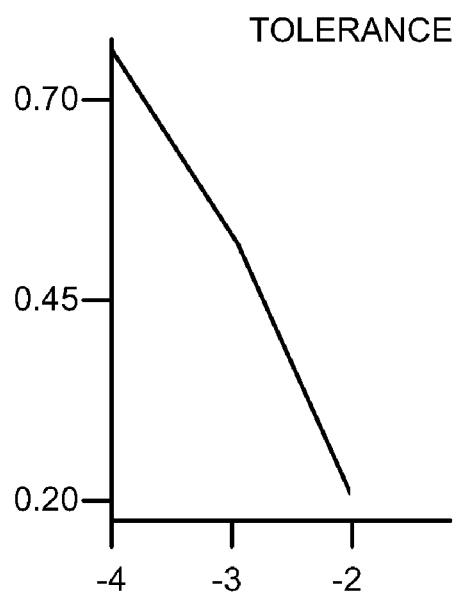
Figure 24:
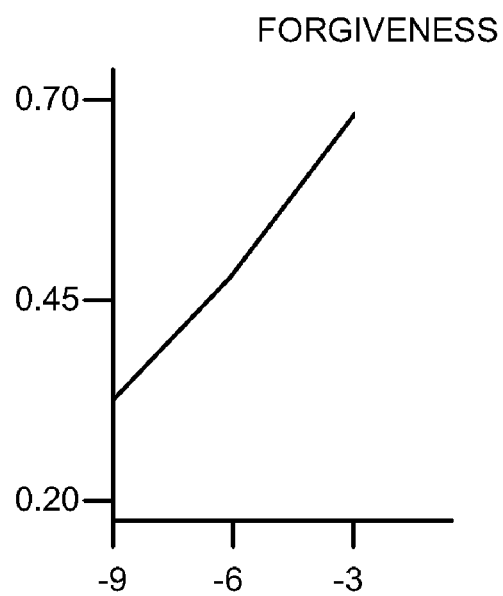
Figure 25:
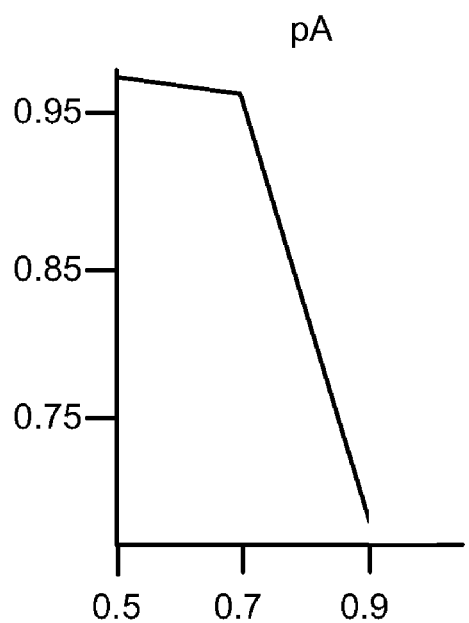
Figure 26:
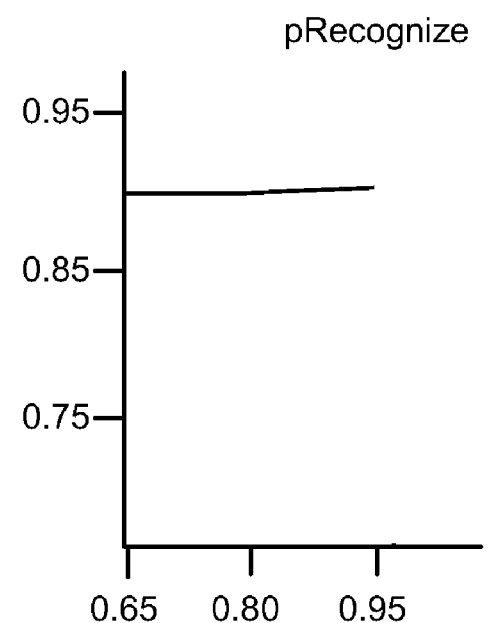
Figure 27:
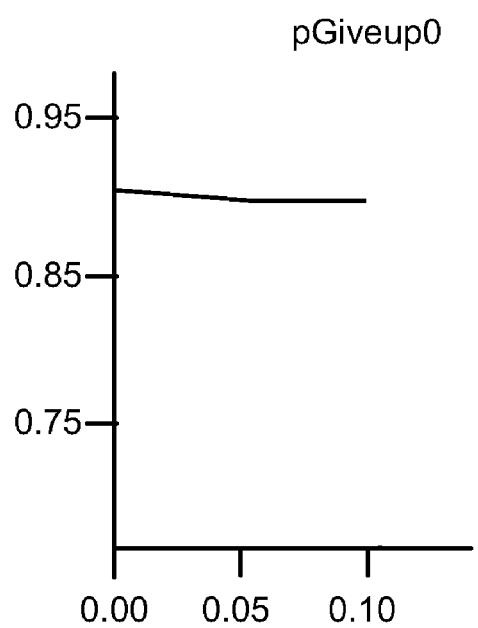
Figure 28:
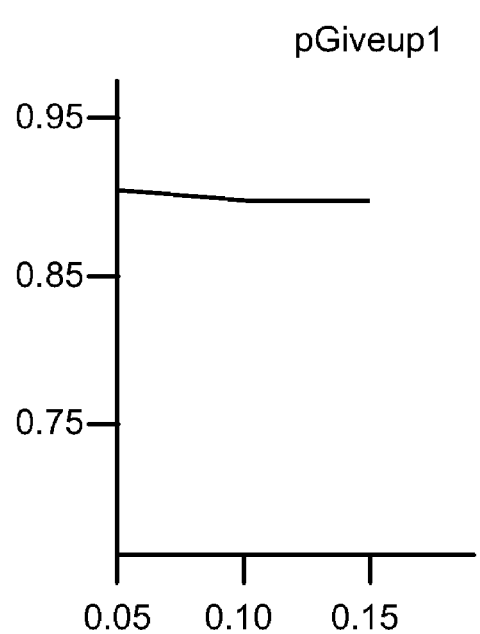
Figure 29:
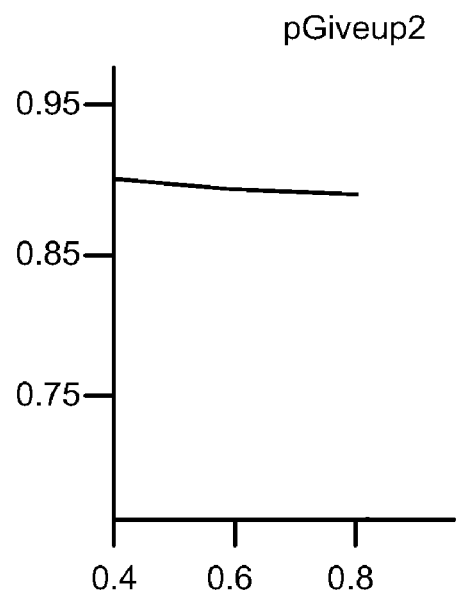
Figure 30:
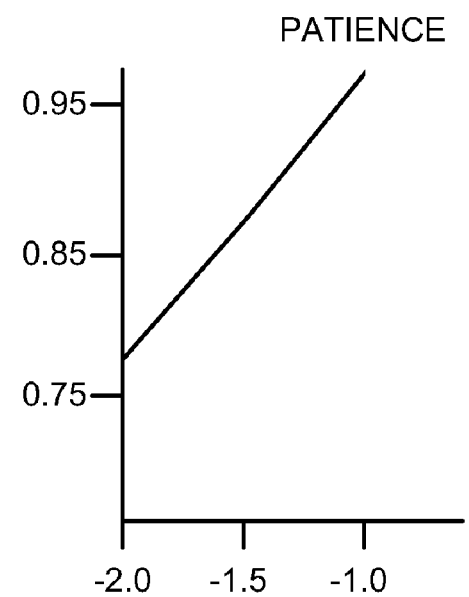

FIG. 17-24 show how inclusion of the agent action, "conf-b", varies for learned interaction policies depending on the values of the parameters. In FIGS. 17-24, a vertical axis of each graph represents a percentage of dialogs in which the agent performs a "conf-b" action. The percentage of dialogs in which the agent performs a "conf-b" action, as shown in FIGS. 17, 22, and 23, appear to mirror trends for parameters "pA", "patience", and "tolerance", with respect to FIGS. 9, 14, and 15 for the same reasons discussed with respect to those FIGS. Sensitivity to other parameters also appears to be indicated. For example, because a "conf-b" action may be followed by a user action of "say-no", the percentage of dialogs in which the agent may perform the "conf-b" action is sensitive to the "pGiveup" parameters. In particular, as shown in FIGS. 19-21, as the user is more likely to give up, the agent learns to provide fewer opportunities for the user to give up, and as the consequences of giving up decreases (i.e., as a value of the parameter, forgiveness, increases), the agent is more likely to perform the "conf-b" action (see FIG. 24). Further, as shown in FIG. 18, when recognition accuracy increases, a need to perform a confirmation action decreases.

Figure 31:
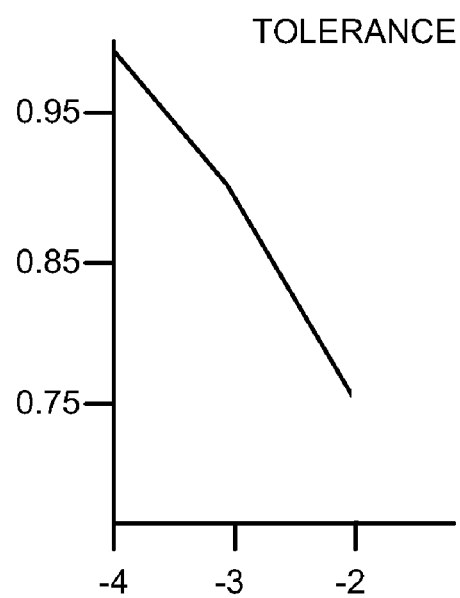
Figure 32:
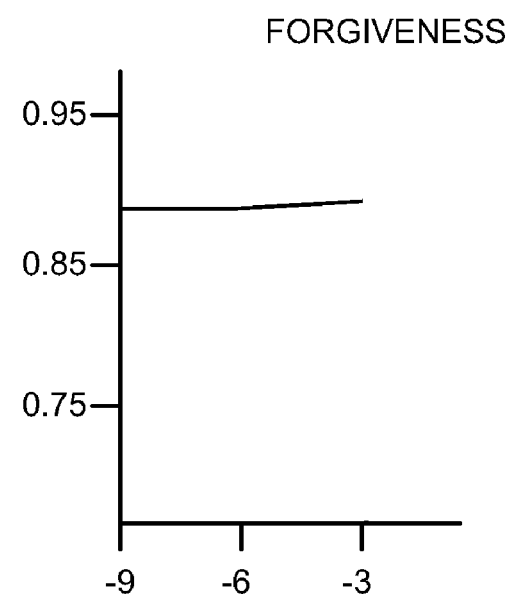

FIGS. 25-32 illustrate how inclusion of the agent action, "do-b", varies for learned interaction policies depending on the values of the parameters. In FIGS. 25-32, a vertical axis of each graph represents a percentage of dialogs in which the agent performs a "do-b" action. According to FIGS. 25-32, when the parameter, "pA", is very high, the percentage of dialogs in which the agent performs a "do-b" action is low (see FIG. 25), when the parameter, "patience", is high, the percentage of dialogs in which the agent performs a "do-b"

action is quite high (see FIG. 30), and when the parameter, "tolerance", is high, the percentage of dialogs in which the agent performs a "do-b" action is low (see FIG. 31).

A number of learned interaction policies included no "do-b" agent actions. In particular, interaction policies did not include a "do-b" agent action when the parameter, "pA", was very high, when the parameter, "patience", was very high (cost was low for re-requesting input), and when the parameter, "tolerance", was high (user does not mind much that the agent performs a "do-a" action when the goal is a "do-b" action).

As another example of how a dialog may change its behavior based on a parameterized representation, consider an example in which the parameters have values as indicated in Table 2 for an easy-going user and a system with poor recognition accuracy.

TABLE 2

| pA | 0.5 |
|---|---|
| pRecognize | 0.65 |
| pGiveup0 | 0.0 |
| pGiveup1 | 0.05 |
| pGiveup2 | 0.4 |
| patience | −1 |
| tolerance | −3 |
| forgiveness | −3 |

Table 3 illustrates a dialog governed by a learned interaction policy when the parameters have values as indicated in Table 2.

TABLE 3

| USER STATE | OBSERVATION | AGENT ACTION |
|---|---|---|
| b, open, no-0 | in-open | request |
| b, say-b, no-0 | in-exit | request |
| b, say-b, no-0 | in-b | do-b |
| done, close, no-0 | in-exit | do-exit |

As illustrated by Table 3, first, a user state reflects that a user has a goal of "b", the user performs an "open" action to open an application, and a dialog history indicates no "say-no" actions by the user. The agent may be in the "in-open" observation state and the agent performs a "request" action in response to observing the "open" user action.

As a result of the "request" action performed by the agent, the user state changes to reflect the user goal of "b", a user action of "say-b", and a dialog history indicating no "say-no" actions by the user. The agent may misrecognize the "say-b" action by the user and may enter the "in-exit" observation state. However, the interaction policy learned by the agent knows that input is not trustworthy (the probability of a correct recognition is low). Therefore, the agent performs a "request" action as a result of entering the "in-exit" observation state.

Next, the user state changes to reflect the user goal of "b", the user action of "say-b", and the dialog history indicating no "say-no" actions by the user. At this point, the agent correctly recognizes the "say-b" user action and changes to the "in-b" observation state. The agent then performs the "do-b" agent action.

The user state then changes to reflect the user goal of "done", the user action of "close", and the dialog history indicating no "say-no" actions by the user. The agent then correctly recognizes the "done" user action and may enter the "in-exit" observation state. The agent then performs a "do-exit" action.

Consider an example in which the parameters have values as indicated in Table 4 for an impatient user having a preference for "a" and a system with a better recognition accuracy than the system of the previous example.

TABLE 4

| pA | 0.9 |
|---|---|
| pRecognize | 0.8 |
| pGiveup0 | 0.0 |
| pGiveup1 | 0.05 |
| pGiveup2 | 0.4 |
| patience | −2 |
| tolerance | −4 |
| forgiveness | −3 |

Table 5 illustrates a dialog governed by a learned interaction policy when the parameters have values as indicated in Table 4.

TABLE 5

| USER STATE | OBSERVATION | AGENT ACTION |
|---|---|---|
| a, open, no-0 | in-open | request |
| a, say-a, no-0 | in-a | do-a |
| done, close, no-0 | in-exit | do-exit |

As illustrated by Table 5, first, a user state reflects that a user has a goal of "a", the user performs an "open" action to open an application, and a dialog history indicates no "say-no" actions by the user. The agent is in the "in-open" observation state and the agent performs a "request" action in response to observing the "open" user action.

As a result of the "request" action performed by the agent, the user state changes to reflect the user goal of "a", a user action of "say-a", and a dialog history indicating no "say-no" actions by the user. The agent recognizes the "say-a" action by the user and enters the "in-a" observation state. The agent then performs a "do-a" action.

The user state then changes to reflect the user goal of "done", the user action of "close", and the dialog history indicating no "say-no" actions by the user. The agent then correctly recognizes the "done" user action and enters the "in-exit" observation state. The agent then performs a "do-exit" action.

In this example, the agent did not confirm the user actions. Instead, the agent performed the user actions based on the input from the user.

Although the above description may contain specific details, they should not be construed as limiting the claims in any way. Other configurations of the described embodiments of the invention are part of the scope of this invention. For example, instead of policy generator 206 generating interaction policies based on user models, a number of interaction policies may be predefined based on attributes of expected users. Further, in other embodiments, the steps of the processes described, with respect to FIGS. 5-8, may include additional or different steps, and the steps may be performed in a different order. Accordingly, the appended claims and their legal equivalents should only define the invention, rather than any specific examples given.

I claim as my invention:

1. A machine-implemented method for selecting up to a predetermined number of a plurality of interaction policies for use on a wireless communication device, the method comprising:

providing sets of values for a plurality of parameters of a plurality of user models, the plurality of user models corresponding to expected users of the wireless communication device, each of the plurality of parameters representing at least one of a user preference or contextual information with respect to use of the processing device;

learning which ones of the plurality of interaction policies are within a specific tolerance of an optimal interaction policy for the plurality of user models, wherein the learning of which of the ones of the plurality of interaction policies are within the specific tolerance of the optimal interaction policy for the plurality of user models further comprises:

calculating an average score of each of the plurality of interaction policies with respect to each of the plurality of user models; and determining which ones of the plurality of interaction policies have a respective average score within the specific tolerance of an optimal interaction policy score with respect to each of the plurality of user models;

selecting, for the wireless communication device, up to the predetermined number of the learned ones of the plurality of interaction policies that are within the specific tolerance of the optimal interaction policy for the plurality of user models; and simulating, at least a predetermined number of times, user actions for each of the plurality of user models and each of the plurality of interaction policies, wherein the calculating of the score of each of the plurality of interaction policies with respect to each of the plurality of user models is based on the simulating.

2. The machine-implemented method of claim 1 further comprising:

selecting, for the wireless communication device, up to the predetermined number of the learned ones of the plurality of interaction policies that are within the specific tolerance of the optimal interaction policy for the plurality of user models and that are expected to reach a goal of the user in a minimum number of dialog turns.

3. The machine-implemented method of claim 1 wherein the sets of values of the plurality of parameters for the plurality of the plurality of user models are based, at least partly, on market studies.

4. The machine-implemented method of claim 1 wherein:

the plurality of user models is implemented via an interaction model; and each of the set of values for the plurality of parameters define a user model of the plurality of user models when used with the interaction model.

\* \* \* \* \*